July 2, 1929.  D. G. STEELY  1,719,570
HAND DIPPING TABLE
Filed June 23, 1927   2 Sheets-Sheet 2
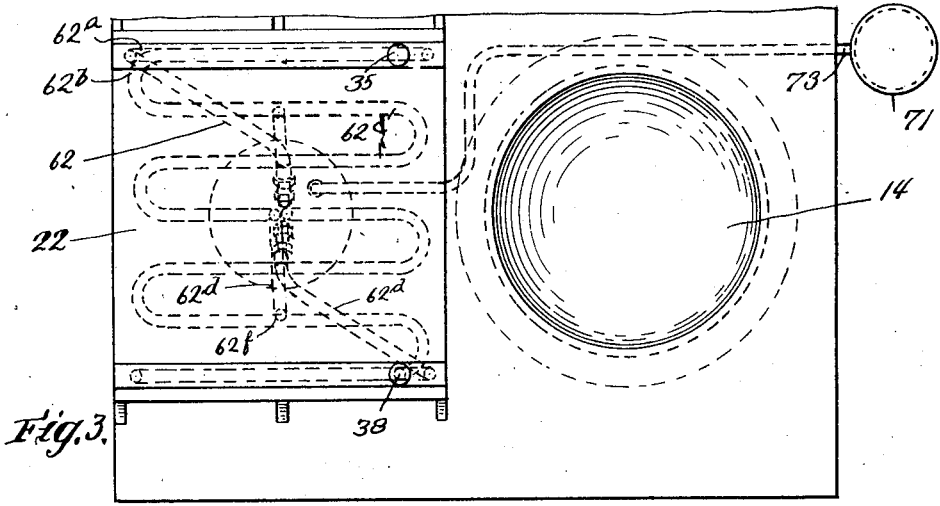
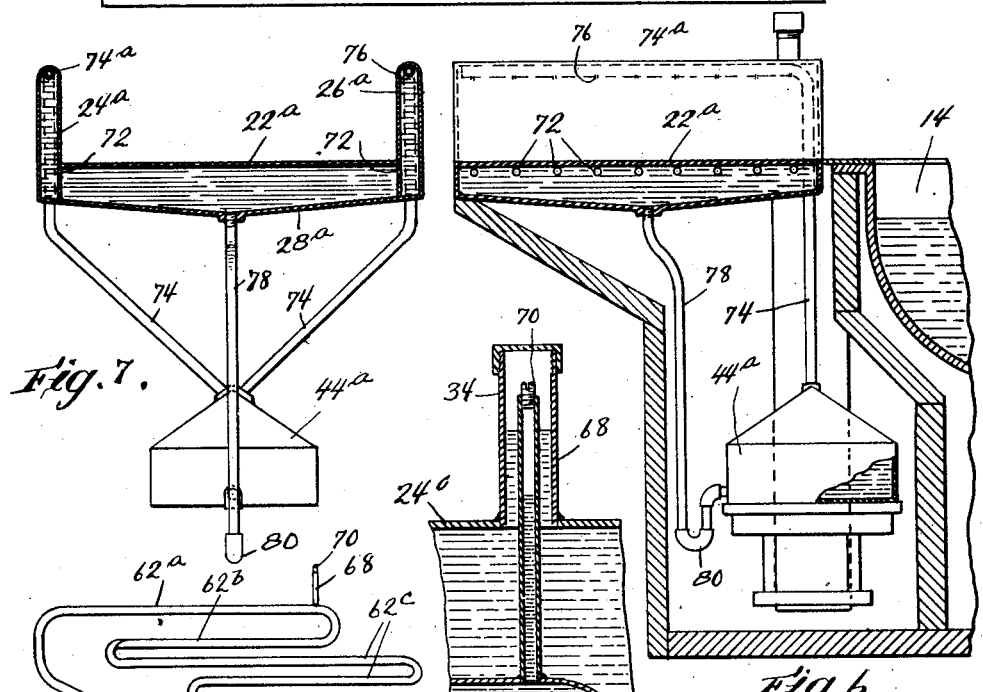
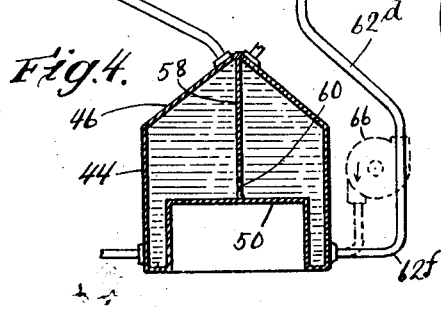
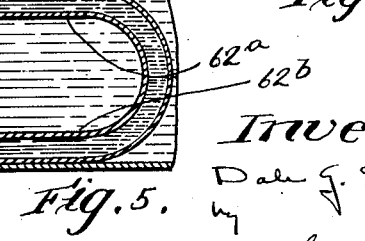

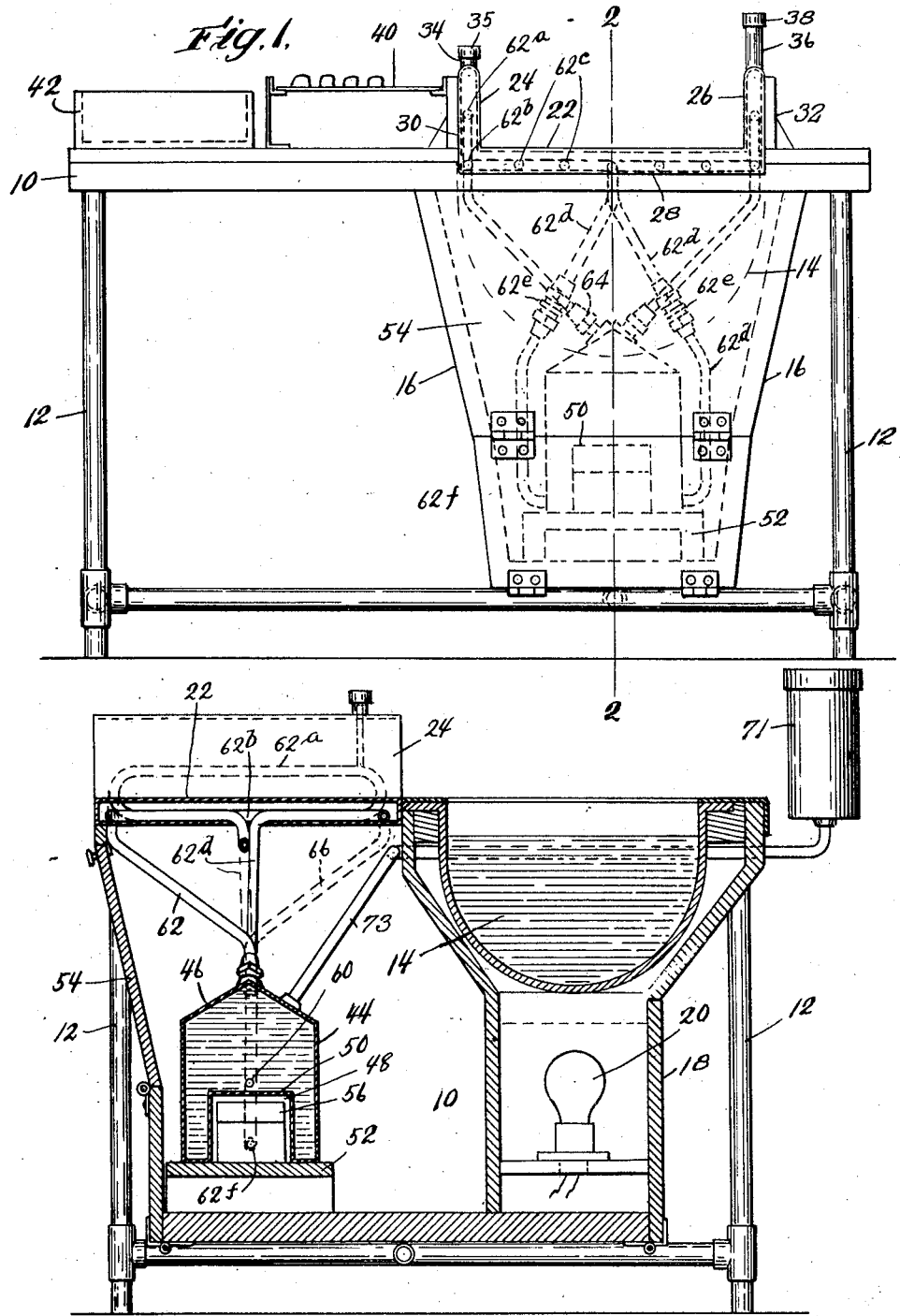

Patented July 2, 1929.

1,719,570

UNITED STATES PATENT OFFICE.

DALE G. STEELY, OF ARLINGTON, MASSACHUSETTS, ASSIGNOR TO W. F. SCHRAFFT & SONS CORPORATION, OF BOSTON, MASSACHUSETTS, A CORPORATION OF MASSACHUSETTS.

HAND DIPPING TABLE.

Application filed June 23, 1927. Serial No. 200,865.

This invention relates to confection making and particularly to the coating of centers and to a hand dipping table used for coating the centers by hand.

The chocolate coatings are applied by hand by the use of a so-called hand dipping table which comprises a well or open-top receptacle in which a supply of melted chocolate is contained and a flat plate or table upon which the operator maintains a supply of chocolate which is drawn as desired from the well. The operator rolls the center about in the chocolate on the plate until the center is thoroughly coated and then deposits the coated confection on a dipping paper. The dipping plate is unheated except in so far as it receives heat from the warm chocolate deposited thereon. In use, the chocolate cools and hardens at the sides of the plate and forms an unsightly crust which is gradually built up in thickness and thus limits the working area of the plate and the freedom of action and the output of the operative. The crust must be removed from time to time and thus entails considerable extra work on the part of the operative and attendants.

Some attempt has been made to take the chill off the dipping plate but, so far as I am aware, no commercially successful device or method has been brought forth.

It is an object of this invention to provide a dipping table having a dipping plate on which the confections are coated with means to heat the plate at a temperature which preferably is just above the setting temperature of the chocolate so as to maintain the chocolate fluid and to prevent the formation of a chocolate crust, thus to reduce the amount of chocolate necessary to be supplied to a dipping table and also to improve the quality of the confection and to increase the daily output of the operator and reduce the labor of attendants.

A further object is to provide a dipping plate with side walls which retain on the plate the fluid chocolate and at the same time to enable the operator to keep a comparatively large supply of chocolate on the plate without it spreading too far; and to heat the side walls so as to prevent the formation of a crust thereon.

A further object is a novel form of heating means for the dipping plate so arranged as to maintain the plate at a uniform and suitably low temperature.

A yet further object is generally to improve methods and apparatus for the coating of confections.

Fig. 1 is a front elevation of a dipping table embodying the invention.

Fig. 2 is a sectional elevation taken along line 2—2 of Fig. 1.

Fig. 3 is a plan view of that portion of the dipping table embodying the invention.

Fig. 4 is a diagrammatic view illustrating the arrangement of the heating coil for the dipping plate.

Fig. 5 is a sectional detail illustrating the disposition of the expansion pipe for a heating coil.

Fig. 6 is a sectional detail taken in the same location as Fig. 2, but illustrating a modified arrangement for heating the table.

Fig. 7 is a transverse sectional elevation through the dipping table of Fig. 6.

The dipping table here shown as embodying the invention comprises a top or base 10 supported by legs 12. At the rear right hand portion of the table is disposed a receptacle or well 14, the top of which may be approximately flush with the top of the base 10 and in which a quantity of melted chocolate is adapted to be maintained. The vessel is received within heat-insulating walls 16, Fig. 1, and end walls 18, Fig. 2, and is adapted to be maintained moderately heated by a suitable electric heater 20. But little heat is necessary to maintain the chocolate in the receptacle in fluid condition since the chocolate is originally warm and fluid when deposited within the receptacle and is surrounded by insulating walls so that but little heat is lost by radiation. A dipping or coating plate 22 is disposed immediately in front of the well 14 and approximately in line with the top thereof. Said dipping plate is horizontally disposed and is flat and is composed of sheet metal, as planished iron. Said plate is provided with upstanding metal walls 24 and 26 at the opposite sides thereof while the forward and rear edges of the plate may be without walls. Said plate and the walls are enclosed within a jacket comprising the plate 28 which is disposed beneath and spaced from the dipping plate 22 and the upstanding plates 30 and 32 which are spaced from the walls 24 and 26 respectively and are connected therewith. The space between the jacket and the dipping plate and its walls is adapted to be fluid tight and preferably is adapted to contain a heat storage liquid, as a light oil. The walls are provided with upstanding tubes 34 and 36 respectively which communicate with the fluid space between the walls 24 and 30, and 26 and 32, respectively and form expansion chambers in which the fluid can expand when heated. The ends of the expansion tubes are preferably closed by means of removable caps 38. The tube 34 is made shorter than the tube 36 in order not to interfere with the operator.

In use, the table is provided with supporting means, as a shelf, to the left of the dipping plate on which a tray 40 is disposed to receive the coated confections. A box 42 holding the uncoated centers is received on the table 10 at the left of the tray 40. The dipping plate 22 is adapted to receive a supply of melted chocolate from the well 14 and the supply is adapted to be replenished from time to time by the operator. Uncoated centers are thrown from the box 42 onto the plate 22 and are rolled about in the melted chocolate until thoroughly coated and then are deposited upon a dipping paper disposed on the tray 40.

The dipping plate 22 and the walls 24 and 26 thereof in the modification shown in Figs. 1 through 5 are heated by heated fluid supplied from a heating tank 44 disposed beneath the dipping table and circulated by thermal action or by a circulation pump through heating coils disposed in the jacket of the dipping plates and its side walls. The heater tank 44 is here shown as of cylindrical formation and has an upwardly tapered conical top wall 46 and a cylindrical well 48 which extends upwardly from the bottom thereof and is provided with a flat upper wall 50. Said tank is supported upon a suitable stand 52 between the heat insulating side walls 16 and in front of a door 54 which may be opened or removed to gain access to the tank and the pipe connections associated therewith. The tank is heated by a small electric stove or heater 56 which has a flat top or heater-disc disposed beneath and adjacent the flat wall 50 so that heat is delivered to the interior of the tank approximately in the middle thereof. Said tank is divided vertically into two sections by means of a partition wall or plate 58 which extends from the tank to the bottom plate 50 thereof for the purpose of providing a more positive thermal circulation of the fluid contents of the heating coils. Said plate is provided with a small aperture or opening 60 in the lower portion thereof through which fluid communication between the tank sections is provided. The heated fluid in the heater tank 44 is circulated through the jacket of the dipping plate through two separate coils. One of said coils comprises a pipe 62 which is in communication with the top of the left hand section of the heater tank, see Fig. 4 and Fig. 1, and is connected with the tank through a detachable coupling 64. Said pipe extends upwardly into the front upper portion of the side wall of a jacket or between the side walls 24 and 30 of the dipping plate and extends horizontally therethrough in the upper portion thereof as indicated at 62$^a$ and returns in the lower portion thereof as indicated at 62$^b$ and then extends in a series of loops 62$^c$ through the left hand portion of the heating jacket under the dipping plate 22. The return end 62$^d$ of the pipe is connected through a detachable coupling 62$^e$ with a pipe 62$^f$ which communicates with the bottom of the right hand section of the heater tank through the bottom portion of the side wall of the tank and below the heater unit. The other heater pipe 66 extends from the top of the right hand section of the heater tank and extends in a similar manner through the bottom of the pan to the bottom of the left hand section of the heater tank. This arrangement is such as to provide for positive thermal circulation of the fluid in the heater tank through the heater coils.

If found desirable, a pump 66 may be inserted in the circuit of the heater coils to forcibly move the fluid therein in the direction of thermal circulation. The topmost portion of the coils are provided with vent or expansion pipes 68 one of which is here shown. The vent pipe is attached to and is in communication with the uppermost section of the pipe in the wall jacket and extends upwardly into one of the vent pipes as the vent pipe 34 of the wall jacket and has its end normally sealed by the screw 70. The arrangement is such that the fluid-circulatory pipes can be completely filled with the heating fluid and air excluded thereby to permit free thermal circulation of the heating fluid. An expansion tank 71 is carried by the base 10 above and is in communication with the heater tank through the pipe 73 and is adapted to provide for the expansion of the heating fluid. The level of the fluid in said tank is adapted to be above the top of the heater coils in the side wall jackets of the dipping plate.

As thus arranged, the fluid in the heater tank 44 circulates through the fluid in the jacket of the dipping plate and thus maintains the liquid therein warm so that the chocolate on the dipping plate and any that may come in contact with the walls 24 and 26 thereof is maintained fluid. This arrangement has been found to maintain a sufficient and uniform temperature to keep the chocolate on the dipping plates fluid and yet without elevating the temperature of the chocolate to such an extent as to interfere with the proper tempering of the chocolate on the plate and causing the finished goods to turn dull or gray.

In the modification shown in Figs. 6 and 7, the side walls 24ª and 26ª extend downwardly below the top plate 22ª to the bottom of the jacket plate 28ª, and are provided with a series of apertures 72 therein through which communication is established between the plate jacket and the wall jackets. In this modification the fluid in the jackets is adapted to be circulated through the heater tank 44ª. To this end, pipes 74 are extended from the top of the heater tank 44ª into the top of the wall jackets and the pipe sections 74ª are extended horizontally in said wall jackets and are provided with a series of small apertures 76 through which the fluid from the tank 44 can pass into the wall jackets and thence through the openings 72 into the plate jacket. A pipe 78 is in communication with the middle of the plate jacket and extends downwardly below the bottom of the heater tank 44ª and thence upwardly as indicated at 80 into the bottom of the heater tank. The return bend in the heater pipe 78 is for the purpose of insuring thermal circulation upwardly in the pipe 74 and to prevent reverse circulation. This modification may be desirable for certain purposes.

The construction may be otherwise modified without departing from the spirit of the invention.

I claim:

1. A hand dipping table for coating confections with chocolate comprising a dipping plate, means to maintain a liquid in heat-transferring contact therewith, a heater adapted to contain a heating fluid, means to heat the contents of said heater and means to circulate heating fluid between said heater and said liquid and through and in heat-imparting relation with said liquid.

2. A hand dipping table for coating confections with chocolate comprising a jacketed dipping plate containing a liquid, a heater adapted to contain a heating fluid, means to heat the contents of said heater, and means to circulate heating fluid through the jacket of said dipping plate and in heat-transferring relation with the liquid in said jacket.

3. A hand dipping table comprising a horizontal dipping plate having an upstanding side wall, a jacket for said plate and also for said side wall containing a liquid, a heater adapted to contain a heating fluid a means to heat the contents of said heater, and means to circulate the heated fluid through said jacket and between said jacket and heater.

4. A hand dipping table having a well adapted to contain a supply of melted chocolate, a horizontal dipping plate disposed in front of and about on the level with the top of said well adapted to have melted chocolate deposited thereon from said well, a heater disposed below said plate in front of said well adapted to contain a supply of heating liquid, means to heat the liquid of said heater, and means to guide the heated liquid between said heater and plate and in heat-imparting relation with said plate.

5. A hand dipping table having a dipping plate, a jacket therefor adapted to contain a heat-absorbing liquid, a heater adapted to contain a heating fluid, means to heat the fluid of said heater, and means to guide the fluid to circulate the fluid through and in heat-imparting relation with the heat-absorbing liquid in said jacket.

6. A hand dipping table comprising a dipping plate having an upstanding side wall, a pipe disposed in a circuitous manner adjacent the under side of said plate and also along said side wall, a liquid-containing heater in communication with both ends of said pipe, and means to heat the liquid contents of said heater.

7. A hand dipping table comprising a dipping plate, a heater tank disposed below said plate adapted to contain a heating liquid, a conductor disposed to circulate heated liquid between said tank and plate and in heat-imparting relation with said plate having an inlet end in communication with the upper portion of said tank and an outlet end in communication with the lower portion of said tank, and means arranged mainly to heat the liquid in the upper portion of said tank, said tank having a bottom wall which is elevated above the bottom of the side walls and is above the outlet end of said pipe and said heating means being located at and in direct heat-transferring relation with said bottom wall only.

8. A hand dipping table comprising a dipping plate, a heater tank disposed below said plate adapted to contain a heating liquid, a vertically-disposed partition in said tank separating it into two lateral liquid-containing sections, said plate having a small aperture therethrough at the lower portion thereof providing communication between the sections, means to heat the liquid in the tank, and a liquid circulatory pipe arranged to conduct liquid from said tank to said dipping plate in heat-imparting relation therewith having its inlet end for the hot liquid in communication with the top of one tank-section and its return end for the cool liquid in communication with the bottom of the other tank-section.

9. A hand dipping table comprising a dipping plate having an upstanding side wall, and means to direct a heating medium to pass in heat-imparting relation first with the upper portion of said side wall and thence downwardly and under and in heat imparting relation with said plate.

10. A hand dipping table comprising a dipping plate, a heater tank disposed therebeneath and adapted to contain a heating fluid, means to heat the fluid in said tank, and a plurality of means each providing a separate closed-circuit circulatory path for the fluid in said tank arranged in heat-imparting relation with different parts of said dipping plate.

11. A hand dipping table comprising a dipping plate, a heating tank disposed below said plate adapted to contain a heating fluid, said tank having a well extended upwardly therein from the bottom thereof and which is provided with a flat top wall, a heater disposed in the upper portion of said well and immediately under and arranged to heat mainly said flat top wall, and a conductor providing a fluid-circulatory path between said tank and dipping plate having its inlet end in communication with said tank above said well and its return end in communication with said tank at the bottom of said well.

12. A hand dipping table adapted to contain a supply of melted chocolate having a bottom wall and a pair of opposed upstanding side walls, said bottom wall and said side walls having a jacket which contains a liquid that is in heat-transferring contact with said walls, two sets of opposed heating coils located in the liquid in said jacket each having a part which is opposite one of said side walls and another part which is under a portion of said bottom wall, said coils having inlets extended into said jacket at said side walls and adjacent outlets which leave said jacket under the middle of said bottom wall, and a liquid heating tank having communication at the top and bottom respectively with said coil inlets and outlets.

13. A dipping table having the combination of a flat coating plate having upstanding walls at the sides only, the front and rear ends of said plates being without upstanding walls, means providing a reservoir for chocolate located at and mainly below the rear end of said plate, and means to direct a heated medium to circulate in a definite path in heat-transmitting relation with both said side walls and with said plate.

14. An apparatus for coating confections with chocolate comprising a support providing a space adapted to receive a container for uncoated confections, a shelf disposed immediately beside said space and above said support adapted to receive the freshly coated confections and a heated coating plate located immediately beside and below said shelf adapted to contain a supply of melted chocolate having upstanding heated side walls, the space above said heated plate and walls being free and unobstructed.

In testimony whereof, I have signed my name to this specification.

DALE G. STEELY.